US012752533B2

(12) United States Patent
Ojima et al.

(10) Patent No.: US 12,752,533 B2

(45) Date of Patent: Oct. 6, 2026

(54) LIQUID EJECTION HEAD, MANUFACTURING METHOD FOR LIQUID EJECTION HEAD, AND PROTECTION TAPE

(71) Applicant: CANON KABUSHIKI KAISHA, Tokyo (JP)

(72) Inventors: Masatomo Ojima, Saitama (JP); Tomohisa Atsuta, Tokyo (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 18/601,733

(22) Filed: Mar. 11, 2024

(65) Prior Publication Data

US 2024/0308218 A1 Sep. 19, 2024

(30) Foreign Application Priority Data

Mar. 13, 2023 (JP) ................................ 2023-038560

(51) Int. Cl.

| | |
|---|---|
| ***B41J 2/14*** | (2006.01) |
| ***B41J 2/16*** | (2006.01) |
| ***B41J 2/175*** | (2006.01) |

(52) U.S. Cl.

CPC ............... *B41J 2/1433* (2013.01); *B41J 2/16* (2013.01); *B41J 2/1623* (2013.01); *B41J 2/175* (2013.01); *B41J 2002/14411* (2013.01)

(58) Field of Classification Search

CPC . B41J 2/1433; B41J 2/16; B41J 2/1623; B41J 2/175; B41J 2002/14411

See application file for complete search history.

(56) References Cited

U.S. PATENT DOCUMENTS 5,414,454 A * 5/1995 Reid ..................... B41J 2/1753 347/29

FOREIGN PATENT DOCUMENTS

JP H06320741 A 11/1994

* cited by examiner

*Primary Examiner* — Jason S Uhlenhake

(74) *Attorney, Agent, or Firm* — Canon U.S.A., Inc., IP Division

(57) ABSTRACT

A liquid ejection head includes an ejection orifice forming surface and a protection tape. The ejection orifice forming surface includes a plurality of ejection orifices from which liquid is to be ejected. The protection tape is bonded to the ejection orifice forming surface in a peelable manner. The protection tape includes a base material and an adhesive layer laminated on the base material, and the adhesive layer is brought into contact with the ejection orifice forming surface. The protection tape further includes at least one penetration portion that penetrates at least the base material in a thickness direction of the protection tape at a position being substantially flat and distant from the plurality of ejection orifices in the ejection orifice forming surface.

18 Claims, 11 Drawing Sheets

LIQUID EJECTION HEAD, MANUFACTURING METHOD FOR LIQUID EJECTION HEAD, AND PROTECTION TAPE

BACKGROUND

Field

The present disclosure relates to a liquid ejection head, a manufacturing method for a liquid ejection head, and a protection tape.

Description of the Related Art

In a liquid ejection head of, for example, an ink jet recording apparatus, a protection tape is sometimes used to protect an ejection orifice forming surface in which ejection orifices are formed. Japanese Patent Application Laid-Open No. H06-320741 discloses a nozzle tape for covering a nozzle plate and beads. The beads protect substrate electrodes. In order to prevent the nozzle tape from being lifted, slits are formed in the nozzle tape between the beads and the nozzle plate.

The nozzle tape described in Japanese Patent Application Laid-Open No. H06-320741 covers the nozzle plate and the beads, and hence the nozzle tape is bonded in a curved shape onto the nozzle plate. Thus, even when the slits are formed in the nozzle tape, it is difficult to bring the nozzle tape into close contact with the nozzle plate, and air bubbles are easily generated between the nozzle tape and the nozzle plate. A location where air bubbles are generated is not necessarily constant. However, when positions of the air bubbles overlap the ejection orifices, there is a risk in that liquid leaks from the ejection orifices. The liquid having leaked may solidify and block the ejection orifices, and thus may degrade liquid ejection performance.

SUMMARY

The disclosed liquid ejection head is capable of suppressing generation of air bubbles between a protection tape and an ejection orifice forming surface.

According to an aspect of the present disclosure, a liquid ejection head includes an ejection orifice forming surface including a plurality of ejection orifices from which liquid is to be ejected, and a protection tape bonded to the ejection orifice forming surface in a peelable manner, wherein the protection tape includes a base material and an adhesive layer laminated on the base material, and the adhesive layer is brought into contact with the ejection orifice forming surface, and wherein the protection tape further includes at least one penetration portion that penetrates at least the base material in a thickness direction of the protection tape at a position being substantially flat and distant from the plurality of ejection orifices in the ejection orifice forming surface.

Further features of the present disclosure will become apparent from the following description of exemplary embodiments with reference to the attached drawings.

DESCRIPTION OF THE EMBODIMENTS

Now, some embodiments of the present disclosure are described with reference to the drawings. In the following embodiments, a liquid ejection head that ejects ink is described as a subject, but liquid to be ejected is not limited to ink. Any liquid that can be ejected by the liquid ejection head may be adopted. In the following description and the drawings, a direction parallel to an ejection orifice forming surface and orthogonal to ejection orifice rows is defined as an X direction, a direction in which the ejection orifice rows extend is defined as a Y direction, and a direction orthogonal to a thickness direction of a protection tape 3 and the ejection orifice forming surface is defined as a Z direction. The X direction, the Y direction, and the Z direction are orthogonal to one another. The X direction substantially matches a peeling direction of the protection tape 3 or a direction in which second peripheral edge portions 3A extend along the peeling direction of the protection tape 3.

First Embodiment

Figure 1:
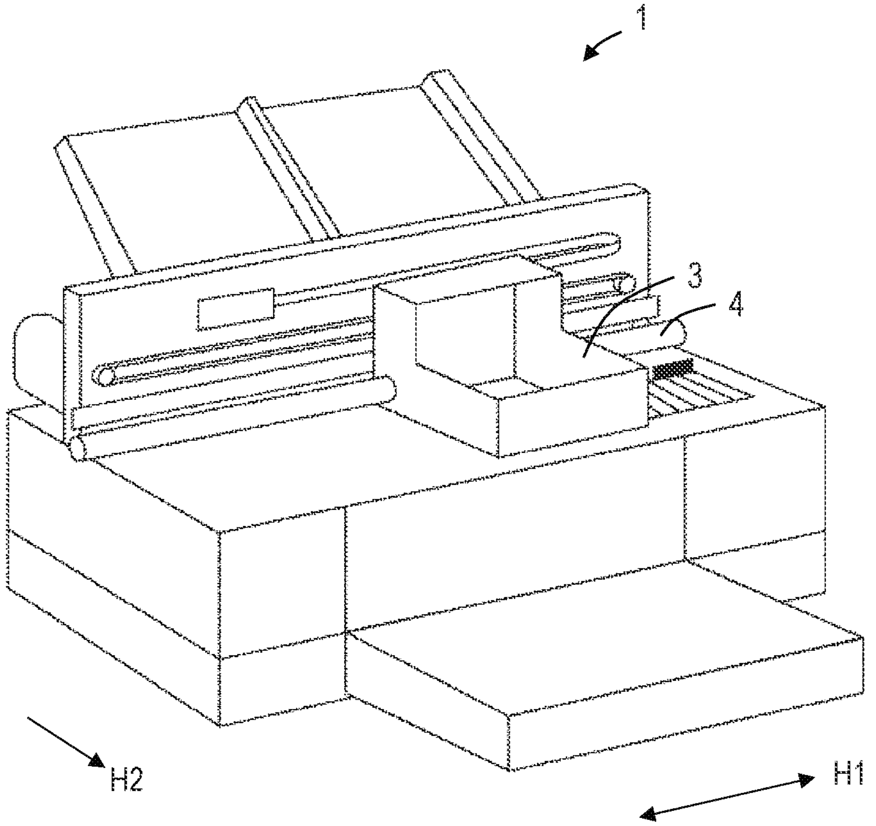
FIG. 1 is a schematic configuration view for illustrating a liquid ejection head according to a first embodiment of the present disclosure.
Figure 2A:
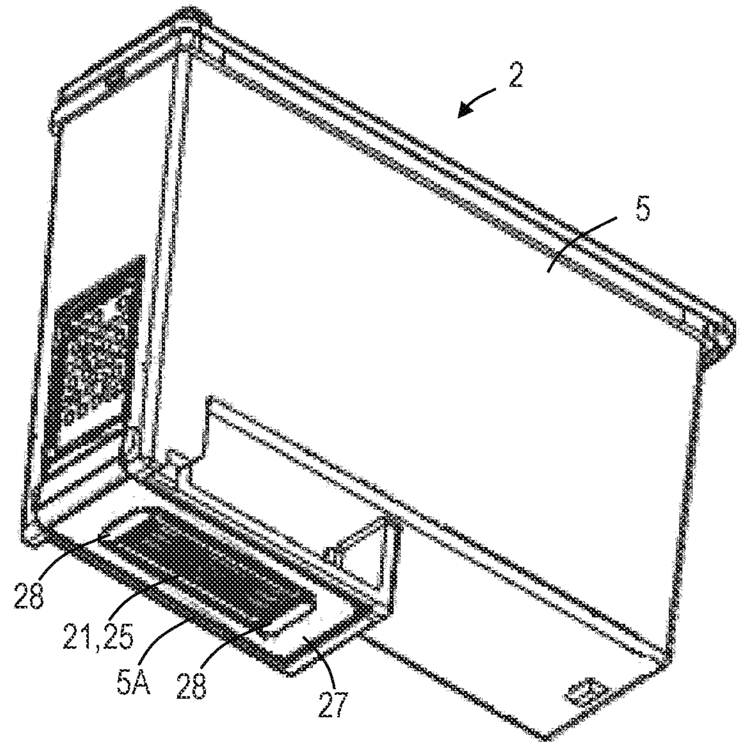
FIG. 2A and FIG. 2B are schematic perspective views for illustrating the liquid ejection head before and after bonding of a protection tape.
Figure 2B:
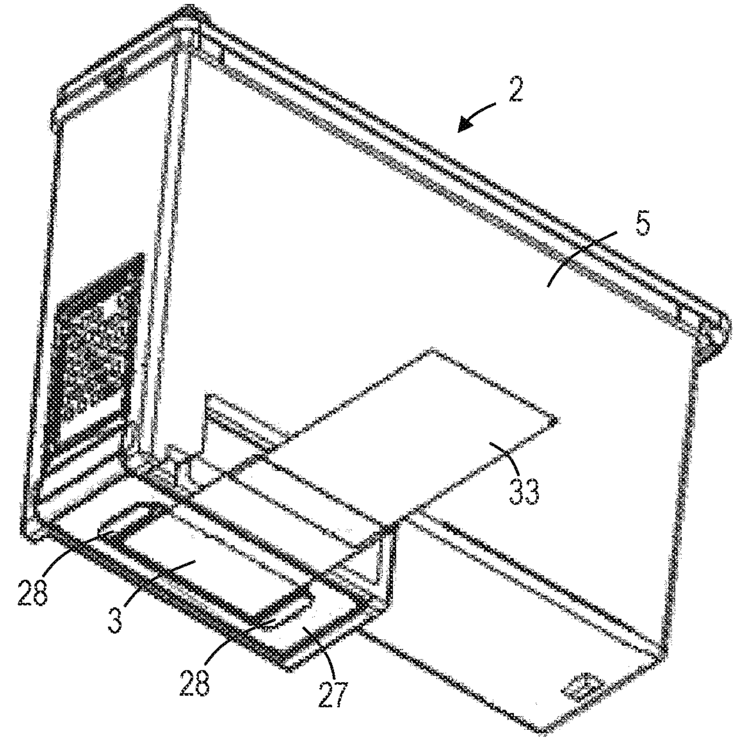
Figure 3A:
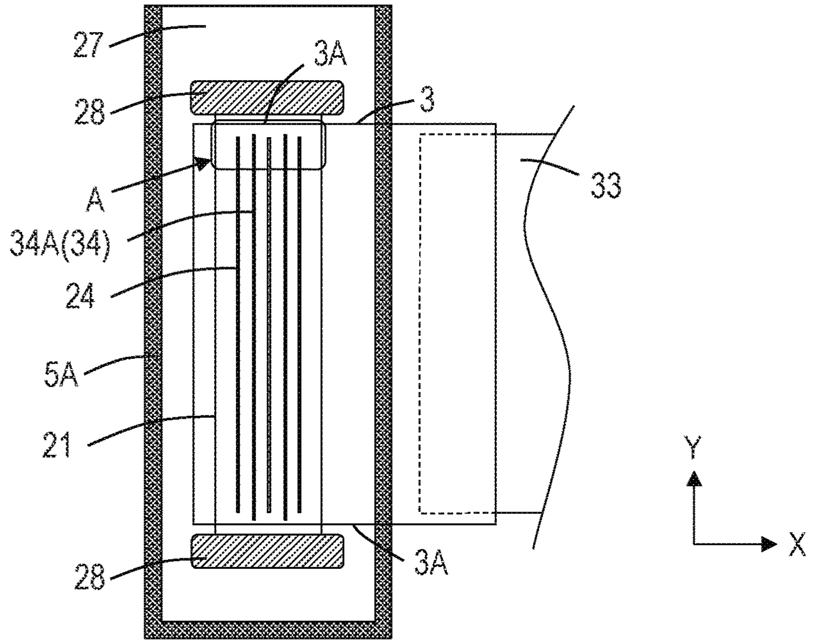
FIG. 3A, FIG. 3B, and FIG. 3C are schematic views for illustrating a configuration of the protection tape.
Figure 3B:
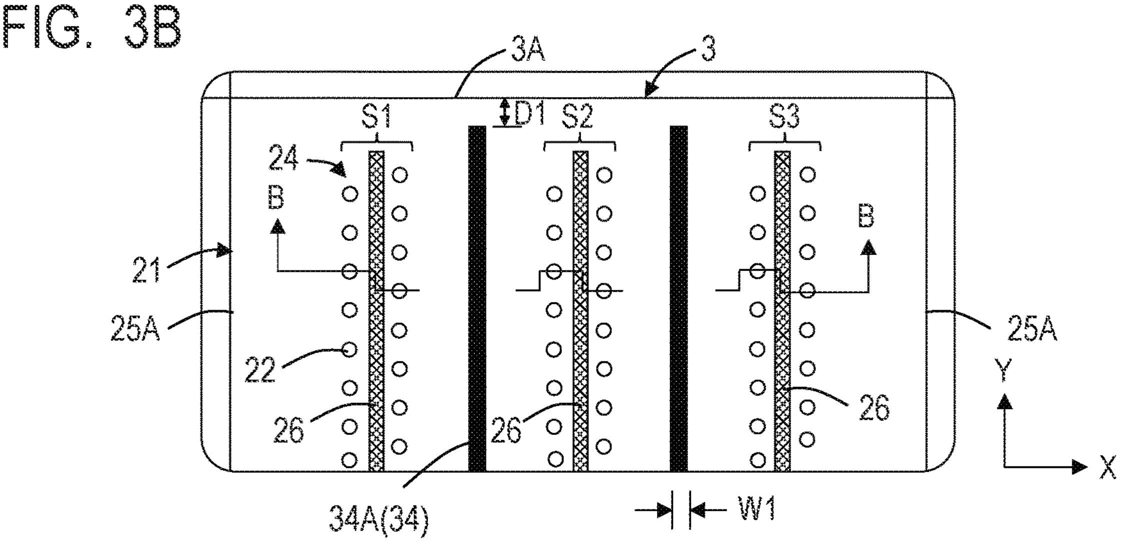
Figure 3C:
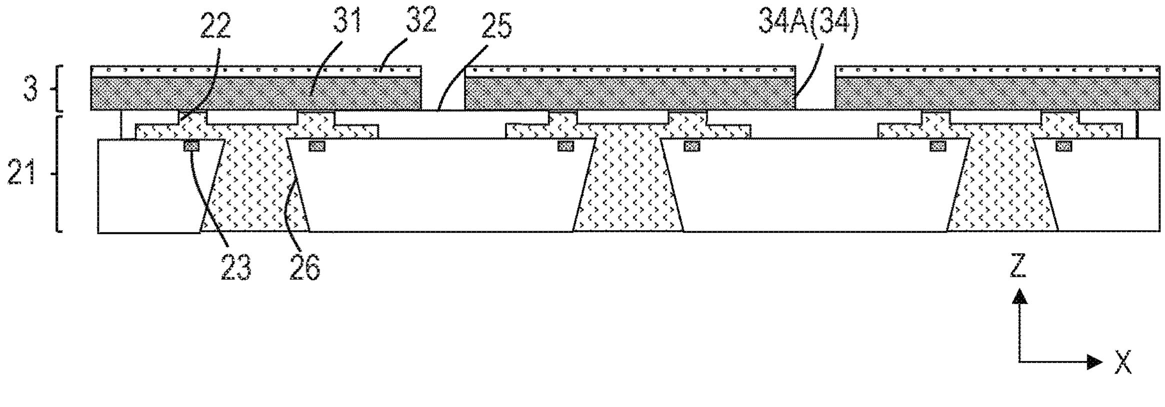

FIG. 1 is a schematic perspective view for illustrating a liquid ejection apparatus 1 according to a first embodiment of the present disclosure. FIG. 2A is a schematic perspective view for illustrating a liquid ejection head 2 from which the protection tape 3 has been peeled away. FIG. 2B is a schematic perspective view for illustrating the liquid ejection head 2 onto which the protection tape 3 has been bonded. FIG. 3A is a plan view of an ejection orifice forming surface 25 and the protection tape 3 when viewed from a direction orthogonal to the ejection orifice forming surface 25, for illustrating a positional relationship between the ejection orifice forming surface 25 and the protection tape 3. FIG. 3B is an enlarged view for illustrating a portion A of FIG. 3A. For convenience, ejection orifice rows 24 are illustrated in FIG. 3A, and ejection orifices 22, the ejection orifice rows 24, and liquid supply paths 26 are illustrated in FIG. 3B. FIG. 3C is a sectional view taken along the line B-B of FIG. 3B, for illustrating the protection tape 3.

The liquid ejection apparatus 1 is an ink jet recording apparatus including a carriage 3 on which the liquid ejection head 2 is mounted, and a guide shaft 4 that guides the carriage 3 (the liquid ejection head 2 is not shown in FIG. 1). The guide shaft 4 extends along a main scanning direction H1 (width direction of a recording medium), and guides the carriage 3 in the main scanning direction H1. The recording medium is conveyed in a sub-scanning direction H2 orthogonal to the main scanning direction H1. The liquid ejection apparatus 1 records an image while alternately moving the liquid ejection head 2 in the main scanning direction H1 and conveying the recording medium in the sub-scanning direction H2. However, the present disclosure is also applicable to a liquid ejection apparatus including a liquid ejection head having a length that is comparable to the maximum width of the recording medium.

The liquid ejection head 2 is integrated with an ink tank 5 that stores ink. The liquid ejection head 2 may be removably mounted to the ink tank 5. The liquid ejection head 2 includes a recording element substrate 21 in which the ejection orifices 22 and energy generating elements 23 are formed, and the recording element substrate 21 is fixed to the ink tank 5. A surface of the recording element substrate 21 to be opposed to the recording medium (not shown) is formed as the ejection orifice forming surface 25 having the plurality of ejection orifices 22 from which the ink is to be ejected. The ejection orifice forming surface 25 has a rectangular shape with long sides and short sides. An electric wiring member 27 connected to a main body of the liquid ejection apparatus 1 is mounted to the ink tank 5, and the ejection orifice forming surface 25 is located inside an opening formed in the electric wiring member 27. The recording element substrate 21 and the electric wiring member 27 are electrically connected to each other at electric connection portions (not shown), and the electric connection portions are sealed with sealing materials 28. The electric connection portions and the sealing materials 28 are provided along both of the short sides of the recording element substrate 21.

As illustrated in FIG. 2B, the liquid ejection head 2 of the liquid ejection apparatus 1 after shipment and before use is provided with the protection tape 3 that is bonded on the ejection orifice forming surface 25 in a peelable manner. The protection tape 3 is provided so as to cover the ejection orifice forming surface 25, to thereby protect the ejection orifice forming surface 25. A tag tape 33 to be used when the protection tape 3 is peeled away is attached to one end of the protection tape 3. When the tag tape 33 illustrated in FIG. 2B is pinched and pulled up, the protection tape 3 can be peeled away from the ejection orifice forming surface 25 as illustrated in FIG. 2A.

The plurality of ejection orifices 22 formed in the ejection orifice forming surface 25 form the plurality of ejection orifice rows 24. The liquid ejection head 2 includes the plurality of liquid supply paths 26 that communicate with the ink tank 5, and each of the plurality of ejection orifice rows 24 is combined with any one of the plurality of liquid supply paths 26. The expression "combined" means that the plurality of ejection orifices 22 forming each of the ejection orifice rows 24 communicate with only the specified liquid supply path 26. The liquid supply paths 26 are provided so as to supply the ink to the ejection orifices 22, but may also be configured to collect and circulate unused ink. The ejection orifice forming surface 25 includes a pair of first peripheral edge portions 25A extending in a direction crossing (in this embodiment, substantially orthogonal to) the peeling direction of the protection tape 3 (that substantially matches the X direction).

Three liquid supply paths 26 are provided in this embodiment. On each side of each liquid supply path 26, one ejection orifice row 24 combined with each liquid supply path 26 is formed. Accordingly, six ejection orifice rows 24 are formed on the ejection orifice forming surface 25. One liquid supply path 26, and two ejection orifice rows 24 formed respectively on both sides of the one liquid supply path 26 constitute one set. Accordingly, in this embodiment, three sets (hereinafter, referred to as a first set S1, a second set S2, and a third set S3) are provided. The six ejection orifice rows 24 and the three liquid supply paths 26 extend in the Y direction in parallel to each other. Although illustration is omitted, one ejection orifice row 24 may correspond to one liquid supply path 26. That is, one ejection orifice row 24 combined with each of the liquid supply paths 26 may be formed on only one side of each of the liquid supply paths 26.

As illustrated in FIG. 3C, the protection tape 3 includes a base material 32, and an adhesive layer 31 that is laminated on the base material 32 and is brought into contact with the ejection orifice forming surface 25. The configuration of the base material 32 is not limited, and the base material 32 can be configured to include, for example, one layer to three layers. Gas permeability of the base material 32 is lower than gas permeability of the adhesive layer 31. The protection tape 3 includes a pair of second peripheral edge portions 3A that are arranged along the X direction. The second peripheral edge portions 3A extend substantially straight. The protection tape 3 is bonded in substantially parallel to the X direction (that is, bonded such that the second peripheral edge portions 3A are substantially parallel to the X direction), but the protection tape 3 may be slightly inclined from the X direction.

As illustrated in FIG. 3A, the protection tape 3 is arranged so as to avoid the sealing materials 28. The protection tape 3 is bonded so as to cover all the ejection orifices 22 and be located between the sealing materials 28 on both sides. All the ejection orifices 22 are located between the two second peripheral edge portions 3A. The protection tape 3 is bonded only to a part of the electric wiring member 27, a part of an edge portion 5A of the ink tank 5, and a substantially flat surface of the ejection orifice forming surface 25. The expression "substantially flat" means that the ejection orifice forming surface 25 includes minute distortion (to be described later), but excludes portions of the ejection orifice forming surface 25 on which the sealing materials 28 are formed. The substantially flat surface substantially matches a region of the ejection orifice forming surface 25 located between the two sealing materials 28. The protection tape 3 is bonded to the ejection orifice forming surface 25 while keeping the flat shape, and hence air bubbles are less liable to enter a space between the protection tape 3 and the ejection orifice forming surface 25.

The protection tape 3 includes at least one penetration portion 34 (in this embodiment, a plurality of penetration portions 34) that penetrates the protection tape 3 in a thickness direction Z. The at least one penetration portion 34 is at least one slit 34A. The slit 34A is formed between two ejection orifice rows 24 that belong to different sets, respectively, and are adjacent to each other. The slit 34A extends continuously in parallel to the two ejection orifice rows 24 adjacent to each other, and extends continuously along at least total lengths of the two ejection orifice rows 24 adjacent to each other. In this embodiment, in the Y direction, the slit 34A protrudes from both end portions of the ejection orifice rows 24. It is preferred that the slit 34A be formed at a distance from the ejection orifices 22 in order to reliably seal the ejection orifices 22. In this embodiment, the slit 34A is formed at a substantially equal distance in the X direction from the two ejection orifice rows 24 adjacent to each other.

Accordingly, when viewed from the Z direction, the slit 34A is formed between two sets adjacent to each other. In this embodiment, two slits 34A are formed. The two slits 34A are formed between the first set S1 and the second set S2 and between the second set S2 and the third set S3, respectively. The number of the sets is not limited. When only the first set S1 and the second set S2 are provided, one slit 34A can be formed only between the first set S1 and the second set S2. When four or more sets are provided, each slit 34A can be formed between sets that are adjacent to each other.

Manufacturing Method for Liquid Ejection Head 2

Next, a manufacturing method for the liquid ejection head 2 is described. First, a main body 2A of the liquid ejection head 2 (see FIG. 5A to FIG. 5C) is manufactured. A configuration of the main body 2A of the liquid ejection head 2 and the manufacturing method are the same as those of the relates art, and hence description of the manufacturing method for the main body 2A of the liquid ejection head 2 is omitted. Concurrently with manufacture of the main body 2A of the liquid ejection head 2, or after the manufacture, the protection tape 3 is produced.

As described above, the protection tape 3 includes the base material 32 and the adhesive layer 31 laminated on the base material 32, and at least one slit 34A is formed in the protection tape 3.

Figure 4A:
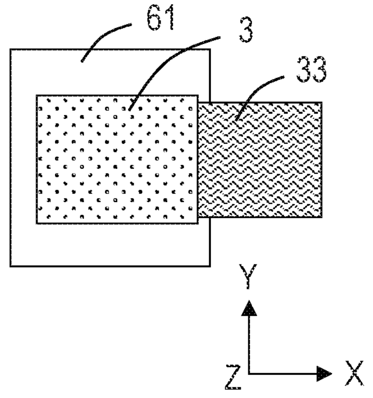
FIG. 4A, FIG. 4B, and FIG. 4C are schematic views for illustrating a process of forming slits in the protection tape.
Figure 4B:
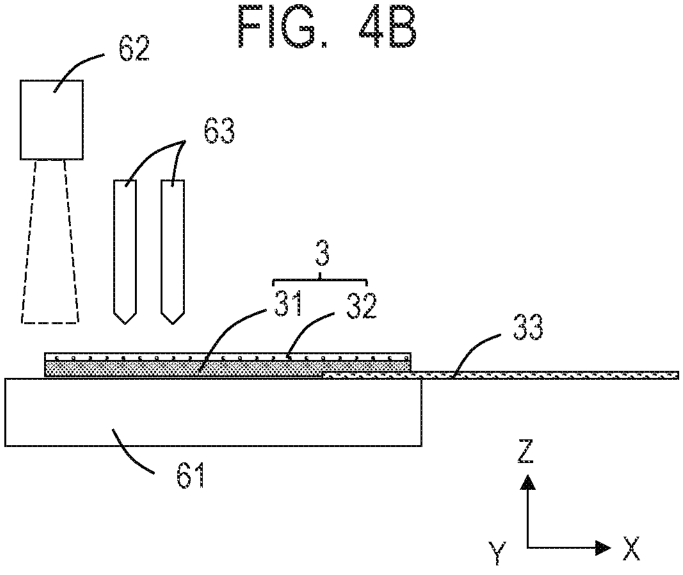
Figure 4C:
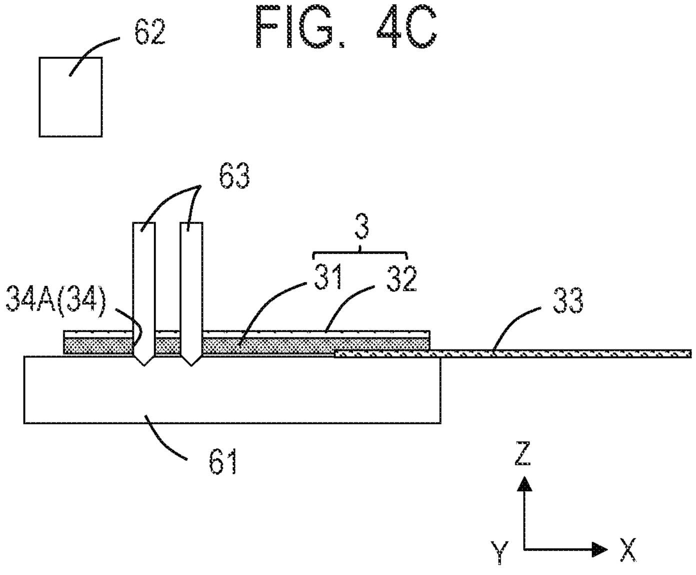

FIG. 4A to FIG. 4C are schematic views for illustrating an example of a process of forming the slit 34A. FIG. 4A is a plan view for illustrating a state in which the protection tape 3 is arranged on a receiving table 61. FIG. 4B is a sectional view for illustrating a method of positioning cutting blades 63 that form the slits 34A. FIG. 4C is a sectional view for illustrating an example of action of the cutting blades 63. First, the protection tape 3 is cut to a desired length in accordance with a dimension of the recording element substrate 21 that varies for each product, and the tag tape 33 is bonded to the protection tape 3. As illustrated in FIG. 4A, the protection tape 3 having the tag tape 33 bonded thereto is placed on the receiving table 61. Next, as illustrated in FIG. 4B, an end portion of the protection tape 3 is detected by an image processing camera 62, and the two cutting blades 63 are each moved to a position away by a predetermined distance in the X direction from a detection position of the end portion of the protection tape 3. Next, as illustrated in FIG. 4C, the cutting blades 63 are lowered, and the cutting blades 63 are moved in the Y direction to form the slits 34A in the protection tape 3. In order to form the slit 34A, a laser may be used in place of the cutting blades 63.

Figure 5A:
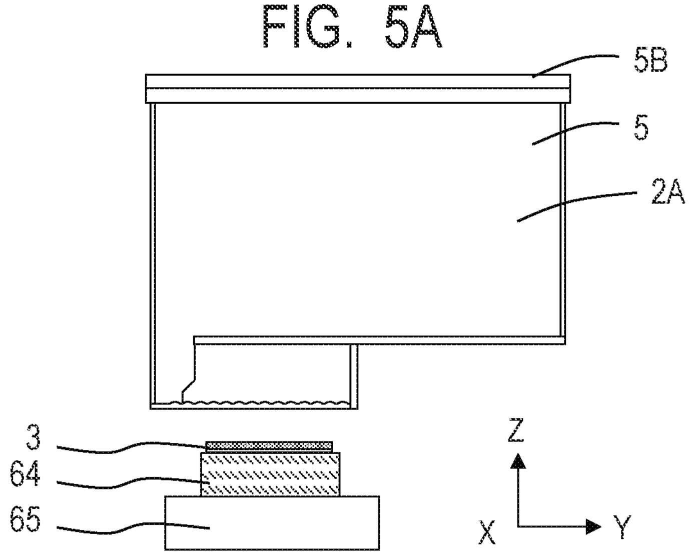
FIG. 5A, FIG. 5B, and FIG. 5C are schematic views for illustrating a process of bonding the protection tape to the liquid ejection head.
Figure 5B:
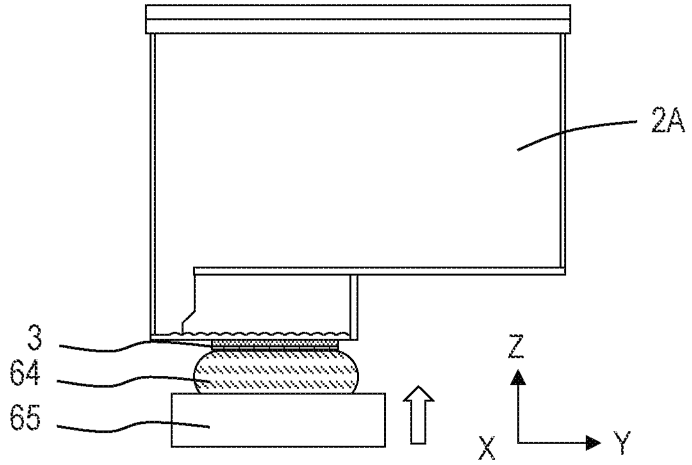
Figure 5C:
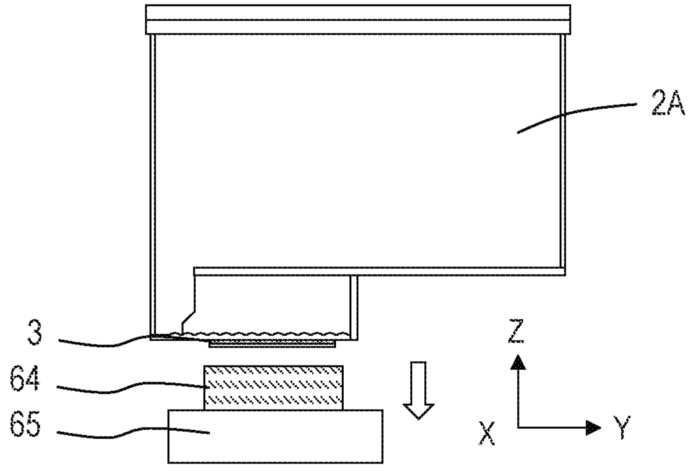

Next, the protection tape 3 having at least one slit 34A (two slits 34A in this embodiment) formed therein is bonded to the ejection orifice forming surface 25 of the liquid ejection head 2 in a peelable manner. FIG. 5A to FIG. 5C are schematic views for illustrating a process of bonding the protection tape 3. The recording element substrate 21 and the electric wiring member 27 are mounted to the ink tank 5 in advance, the ink tank 5 is charged with the ink, and an ink tank lid 5B is welded to the ink tank 5. Next, as illustrated in FIG. 5A, the protection tape 3 having the tag tape 33 bonded thereto is supported on a bonding rubber 64 such that the adhesive layer 31 is opposed to the ejection orifice forming surface 25. The bonding rubber 64 is placed in parallel to the ejection orifice forming surface 25. The bonding rubber 64 is supported on a stage 65 capable of moving up and down in the Z direction. Next, as illustrated in FIG. 5B, the stage 65 is raised, and the protection tape 3 is bonded to the ejection orifice forming surface 25. Next, as illustrated in FIG. 5C, the stage 65 is lowered, and the bonding rubber 64 is separated away from the protection tape 3.

Effects of First Embodiment

Figure 6A:
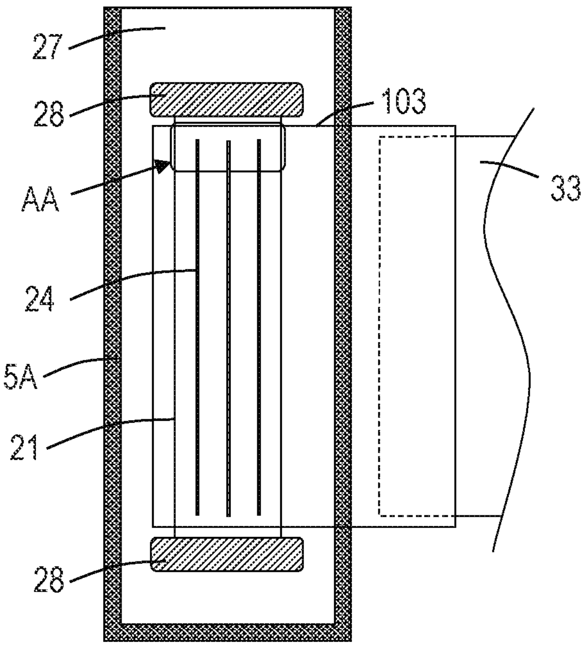
FIG. 6A, FIG. 6B, and FIG. 6C are schematic views for illustrating a configuration of a protection tape in a comparative example.
Figure 6B:
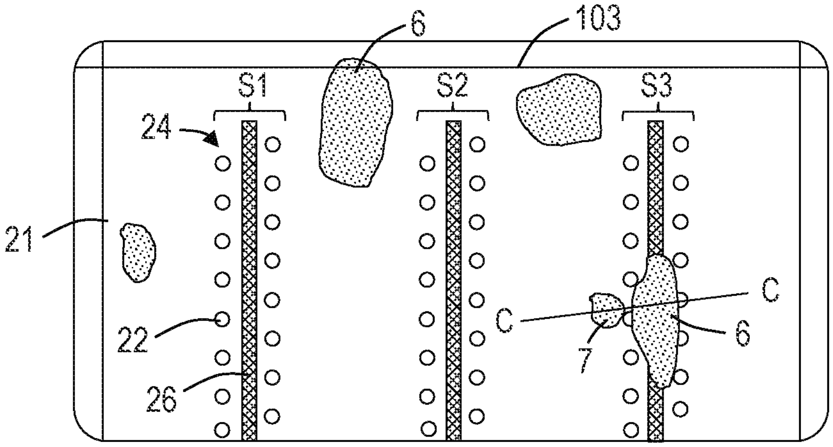
Figure 6C:
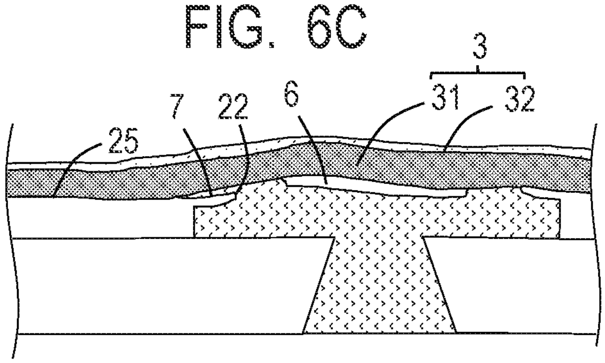

Effects of the first embodiment are described in contrast to those of a comparative example. FIG. 6A to FIG. 6C are illustrations of the ejection orifice forming surface 25 on which a protection tape 103 in the comparative example is bonded. FIG. 6A and FIG. 6B correspond to FIG. 3A and FIG. 3B, respectively, and FIG. 6B is an enlarged view of a portion AA of FIG. 6A. FIG. 6C is a sectional view taken along the line C-C of FIG. 6B. The protection tape 103 in the comparative example has the same configuration as that of the protection tape 3 according to the first embodiment except that the protection tape 103 has no slit 34A.

When the protection tape 103 is bonded to the ejection orifice forming surface 25, it is difficult to completely bring the protection tape 103 into close contact with the ejection orifice forming surface 25, and hence a gap (air-bubble pool 6) is sometimes generated between the protection tape 103 and the ejection orifice forming surface 25. The air-bubble pool 6 is generated due to, for example, the following causes. One cause is rigidity of the base material 32. A thickness of the base material 32 is, for example, from 10 μm to 15 μm, and hence the base material 32 has low rigidity. Even when the protection tape 3 is pressed at the time of bonding, a load is less likely to be transmitted to the protection tape 3 so that the air-bubble pool 6 is easily generated. Another cause is minute distortion caused in the ejection orifice forming surface 25. For example, thermosetting shrinkage of an adhesive, which is used when the recording element substrate 21 is bonded to the ink tank 5, may deform the recording element substrate 21, and cause undulation in the ejection orifice forming surface 25. Alternatively, in a heat curing process when the adhesive is thermally cured, thermal distortion may be caused in the recording element substrate 21 due to a difference in thermal expansion coefficient between the recording element substrate 21 and the ink tank 5. The undulation is distortion of the ejection orifice forming surface 25 formed of minute convex and concave shapes. As illustrated in FIG. 6C, when the protection tape 3 is bonded to the undulated ejection orifice forming surface 25, the air-bubble pool 6 (inclined space) is easily generated between the protection tape 3 and the ejection orifice forming surface 25. Still another cause is a surface shape of a support surface of the bonding rubber 64. The air-bubble pool 6 is easily generated also when the support surface has minute irregularities.

When the air-bubble pool 6 overlaps the ejection orifices 22, the ejection orifices 22 cannot be effectively sealed, and hence the ink may leak from the ejection orifices 22. The ink having leaked from the ejection orifices 22 may gather in the air-bubble pool 6 and generate an ink pool 7. Even in a case in which the ink does not leak immediately after bonding of the protection tape 3, when the ink is kept under a high temperature environment during, for example, transportation after shipment, the air in the air-bubble pool 6 may expand, and the air-bubble pool 6 may reach the ejection orifices 22 to cause leakage of the ink. There is a risk in that the ink in the ink pool 7 adheres to and blocks the ejection orifices 22. There is also a risk in that the ink having leaked flows across the ejection orifice forming surface 25 and mixes with ink of different colors, which may affect a recorded image.

Figure 7:
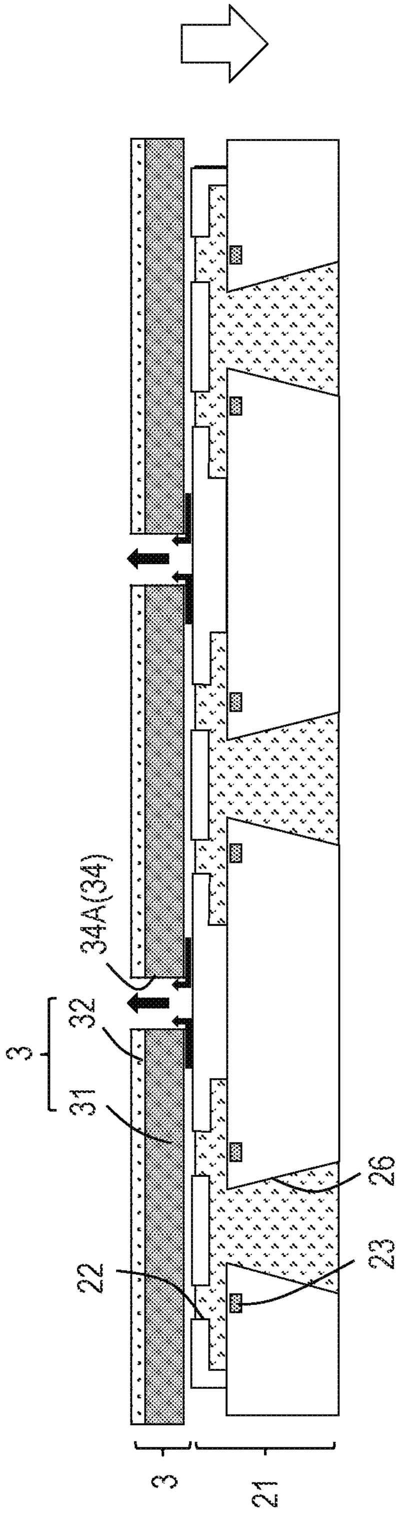
FIG. 7 is a schematic view for illustrating effects of the protection tape according to the first embodiment.

FIG. 7 is a sectional view taken along the line B-B of FIG. 3B, for illustrating a state immediately before the protection tape 3 is bonded to the ejection orifice forming surface 25 in the first embodiment. The air between the protection tape 3 and the ejection orifice forming surface 25 is discharged from the slits 34A (see arrows), thereby suppressing generation of the air-bubble pool 6 in vicinities of the ejection orifices 22. Thus, as illustrated in FIG. 3C, the ejection orifices 22 are sealed with the protection tape 3 more reliably. The ink is less liable to leak from the ejection orifices 22, and the ejection orifices 22 are less liable to be blocked due to adhesion of the ink. This reduces an influence on the recorded image. Further, ink consumption due to evaporation of moisture contained in the ink from the ejection orifices 22 is suppressed. Moreover, improvement in sealing of the ejection orifices 22 contributes to cost reduction by achieving a high yield in a manufacturing process of the liquid ejection head 2 and a packaging process of the liquid ejection apparatus 1.

Although a magnitude and a location of the undulation described above vary depending on a size and a shape of the liquid ejection head 2, the undulation is often more pronounced as the size of the recording element substrate 21 becomes larger. Further, the undulation is sometimes easily generated in a center portion of the ejection orifice forming surface 25. When the slit 34A is formed at a position where the air-bubble pool 6 is easily generated, the air-bubble pool 6 is promptly eliminated, and sealing is improved, thereby improving the yield. The center portion of the ejection orifice forming surface 25 is a portion in which the air bubbles are easily generated in the liquid ejection head 2 according to this embodiment. The magnitude and the location of the undulation can be ascertained in advance by simulation.

Referring to FIG. 3B, when each end portion of each slit 34A in the Y direction is at a separation distance D1 smaller than 0.5 mm from the second peripheral edge portion 3A of the protection tape 3, there is increased a risk in that the protection tape 3 tears when the protection tape 3 is bonded. When the separation distance D1 exceeds 3 mm, a risk of causing generation of the air-bubble pool 6 is increased. It is preferred that the separation distance D1 at the slit 34A be equal to or larger than 1.0 mm and equal to or smaller than 2.0 mm in consideration of an error in making the slit 34A.

When a width W1 of the slit 34A is smaller than 0.2 mm, air-bubble discharge performance is reduced. When the width W1 of the slit 34A exceeds 1 mm, the air-bubble discharge performance is improved, but the rigidity of the protection tape 3 is reduced. As a result, positioning accuracy when the protection tape 3 is mounted onto the bonding rubber 64 is more liable to be reduced. Further, a content of the moisture contained in the ink is extremely small, but the moisture evaporates through the adhesive layer 31. When the width W1 of the slit 34A exceeds 1 mm, the slit 34A is closer to the ejection orifices 22, and hence the moisture contained in the ink is more liable to evaporate through the adhesive layer 31. It is preferred that the width W1 of the slit 34A be equal to or larger than 0.2 mm and equal to or smaller than 0.5 mm in consideration of an error in making the slit 34A.

Modification Example of First Embodiment

Figure 8:
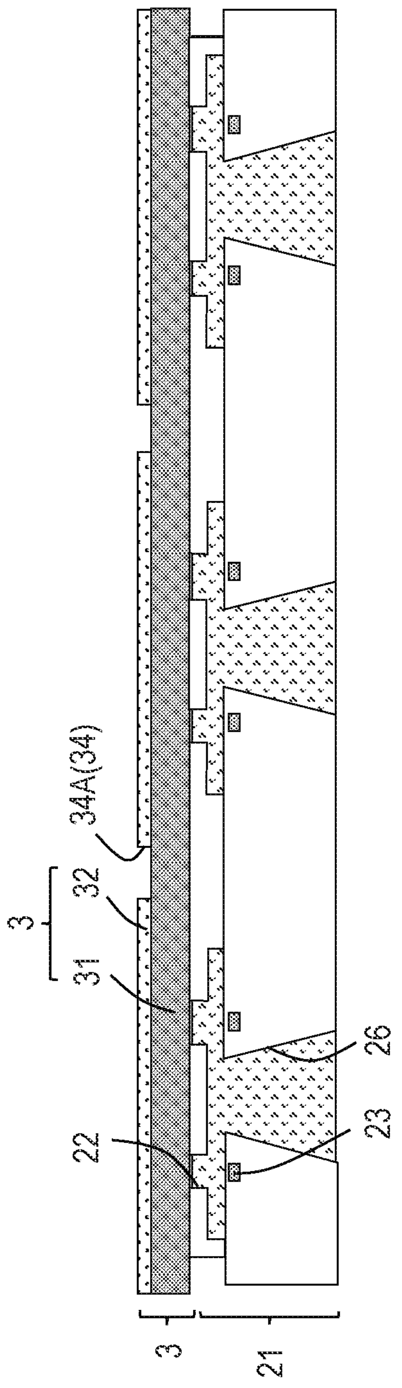
FIG. 8 is a schematic view for illustrating a configuration of a protection tape according to a modification example of the first embodiment.

FIG. 8 is a view corresponding to FIG. 3C, for illustrating a modification example of the first embodiment. As illustrated in FIG. 8, the slit 34A may penetrate only the base material 32 in the thickness direction Z. In other words, the adhesive layer 31 is not required to have the slit 34A. As described above, the adhesive layer 31 has high gas permeability, and the base material 32 has low gas permeability. Thus, the air is relatively easily taken into the adhesive layer 31. The air taken into the adhesive layer 31 is gradually discharged from the slit 34A formed in the base material 32. Although the air-bubble discharge performance is reduced, evaporation of the moisture contained in the ink can be suppressed owing to absence of the slit 34A in the adhesive layer 31. As can be seen from the above description, it is only required that the protection tape 3 according to this embodiment have at least one slit 34A which penetrates at least the base material 32 in the thickness direction Z of the protection tape 3 at a position being substantially flat and distant from the ejection orifices 22 in the ejection orifice forming surface 25.

Another Modification Example of First Embodiment

Figure 9A:
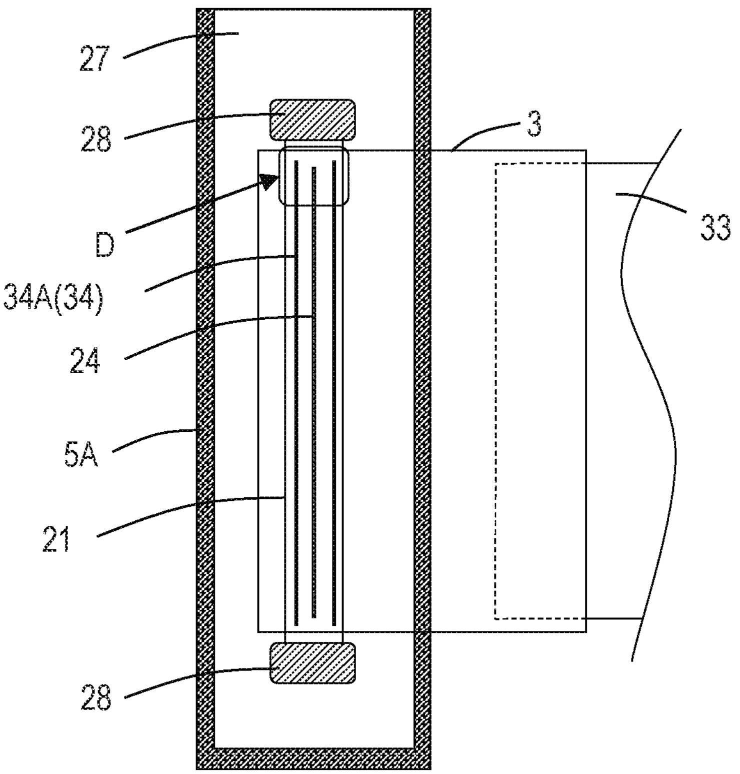
FIG. 9A and FIG. 9B are schematic views for illustrating a configuration of a protection tape according to another modification example of the first embodiment.
Figure 9B:
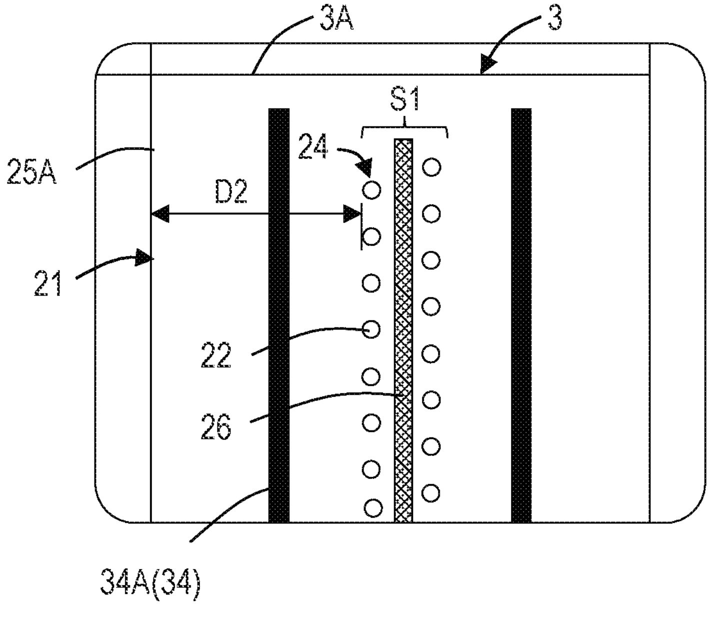

FIG. 9A and FIG. 9B are views for illustrating another modification example of the first embodiment. FIG. 9A corresponds to FIG. 3A. FIG. 9B is an enlarged view of a portion D of FIG. 9A. Only one set including the liquid supply path 26 and the pair of ejection orifice rows 24 is provided. In this case, the slit 34A may be formed between the ejection orifice row 24 and the first peripheral edge portion 25A of the ejection orifice forming surface 25 parallel to the ejection orifice row 24. In order to arrange the slit 34A apart from the ejection orifices 22, it is preferred that a separation distance D2 between the ejection orifice row 24 and the first peripheral edge portion 25A be equal to or larger than 1.5 mm. Although illustration is omitted, also in the first embodiment, the slit 34A can be formed between the first peripheral edge portion 25A of the ejection orifice forming surface 25 and the ejection orifice row 24 closest to the first peripheral edge portion 25A.

Second Embodiment

Figure 10A:
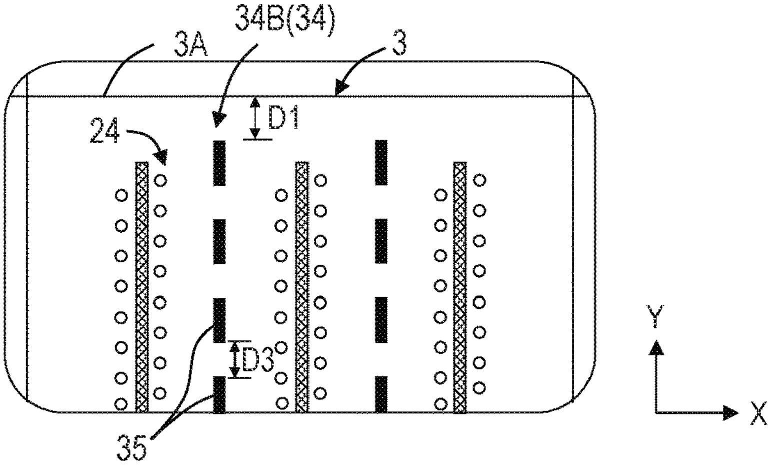
FIG. 10A, FIG. 10B, FIG. 10C, and FIG. 10D are schematic views for illustrating configurations of protection tapes according to a second embodiment to a fifth embodiment.

Now, other embodiments of the present disclosure are described. The configuration and effects omitted from the description are the same as those of the first embodiment. FIG. 10A is a plan view for illustrating a second embodiment. A slit 34B includes a plurality of slits 35 formed intermittently along at least total lengths of the two ejection orifice rows 24 adjacent to each other in the X direction. In other words, the slit 34B in this embodiment has a shape like a dashed line. It is preferred that intervals D3 between the slits 35 be equal intervals of from 3 mm to 5 mm. With this configuration, the rigidity of the protection tape 3 is easily ensured, evaporation of the moisture contained in the ink is easily suppressed, and the air-bubble discharge performance is easily ensured. When the intervals D3 between the slits 35 are equal to or larger than 6 mm, there is a risk in that the air-bubble discharge performance is reduced. It is preferred that the separation distance D1 between the slit 35, among the plurality of slits 35 formed intermittently, closest to the second peripheral edge portion 3A of the protection tape 3 along the peeling direction X, and the second peripheral edge portion 3A be equal to or larger than 1.0 mm and equal to or smaller than 2.0 mm.

Third Embodiment

Figure 10B:
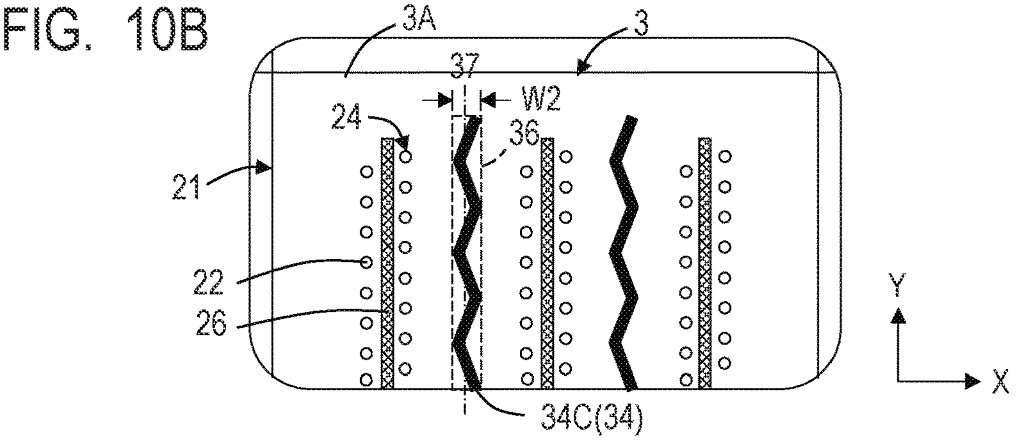

FIG. 10B is a plan view for illustrating a third embodiment. A slit 34C has a corrugated shape. This can increase a total length of the slit 34C as compared to the slit 34A, and hence a possibility in that the slit 34C passes over the air-bubble pool 6 is increased, thereby further improving the air-bubble discharge performance. It is preferred that the corrugated slit 34C extend in parallel to the ejection orifice rows 24 as a whole. That is, it is preferred that a long axis 37 of a minimum rectangle 36 enclosing the corrugated slit 34C extend in parallel to the two ejection orifice rows 24. With this configuration, separation distances between the slit 34A and the ejection orifices 22 are easily ensured. When a width W2 of the minimum rectangle 36 exceeds 0.8 mm, there is increased a risk in that the slit 34C overlaps the ejection orifices 22, which causes a reduction in yield. Accordingly, it is preferred that, in consideration of an error in making the slit 34C, the width W2 of the minimum rectangle 36 be equal to or larger than 0.3 mm and equal to or smaller than 0.6 mm.

Fourth Embodiment

Figure 10C:
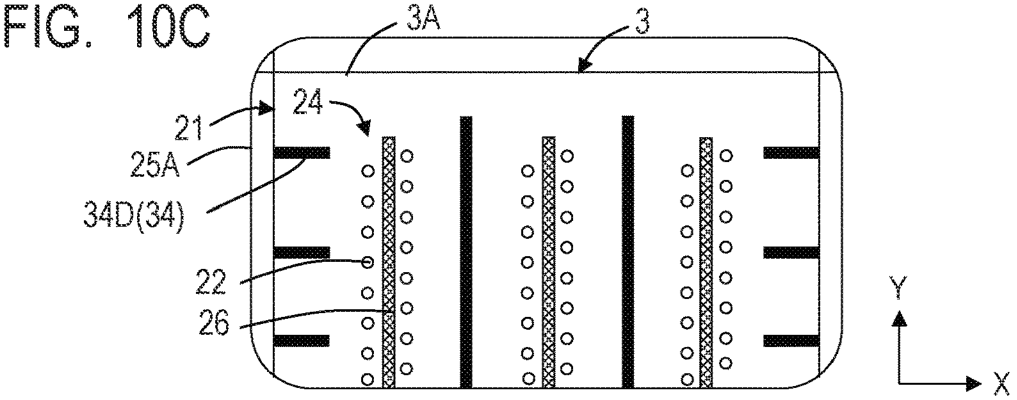

FIG. 10C is a plan view for illustrating a fourth embodiment. At least one slit 34D (in this embodiment, a plurality of slits 34D) is formed between the ejection orifice row 24 closest to each first peripheral edge portion 25A of the ejection orifice forming surface 25, and each first peripheral edge portion 25A. The slit 34D extends at an angle other than 0 degrees with respect to the first peripheral edge portion 25A. The number of the slit 34D is not limited. As described above, the undulation of the ejection orifice forming surface 25 tends to become greater as the size of the recording element substrate 21 becomes larger, and the air-bubble pool 6 may be easily generated also in a vicinity of the first peripheral edge portion 25A of the ejection orifice forming surface 25. In this embodiment, not only air bubbles generated between the ejection orifice rows 24 but also air bubbles generated in the vicinity of the first peripheral edge portion 25A of the ejection orifice forming surface 25 can be discharged. The angle of the slit 34D with respect to the first peripheral edge portion 25A is not limited. In the illustrated example, the slit 34D extends in a direction orthogonal to the first peripheral edge portion 25A, but may extend in a direction that is not orthogonal to the first peripheral edge portion 25A. Although it is preferred that the slit 34D extend to the first peripheral edge portion 25A for improvement of the air-bubble discharge performance, the slit 34D may terminate in front of a peripheral edge portion.

The slit 34D in this embodiment is combined with the slit 34A in the first embodiment, but the first to fourth embodiments can be combined with each other as appropriate to increase the air-bubble discharge performance. Further, as in the modification example of the first embodiment illustrated in FIG. 9A and FIG. 9B, when only one set including the liquid supply path 26 and the pair of ejection orifice rows 24 is provided, the slit 34D may be formed only between the ejection orifice row 24 and the first peripheral edge portion 25A. In this case, in order to arrange the slit 34A apart from the ejection orifices 22, it is preferred that the separation distance D2 between the ejection orifice row 24 and the first peripheral edge portion 25A be equal to or larger than 1.5 mm.

Fifth Embodiment

Figure 10D:
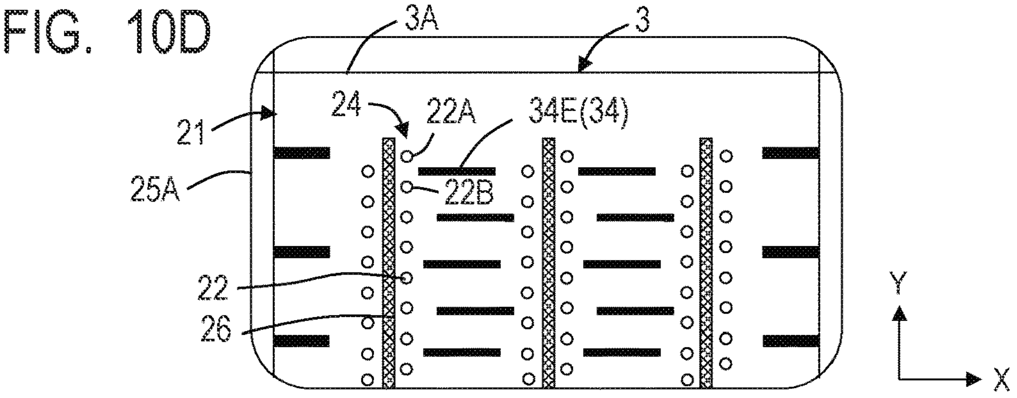

FIG. 10D is a plan view for illustrating a fifth embodiment. Straight slits 34E are formed between two sets adjacent to each other. In this embodiment, the slit 34E extends in a direction orthogonal to the first peripheral edge portion 25A, but an angle of the slit 34E with respect to the first peripheral edge portion 25A is not limited. In a direction (Y direction) in which the two ejection orifice rows 24 extend, the slit 34E is located between an ejection orifice 22A, which has the smallest distance from the slit 34E, and an ejection orifice 22B, which is adjacent to the ejection orifice 22A. When two ejection orifices are equidistant from the slit 34E, any one of the two ejection orifices may be the ejection orifice 22A. Accordingly, even when a bonding position of the protection tape 3 is shifted in the Y direction within tolerance, a risk in that the slit 34E overlaps the ejection orifices 22A and 22B is reduced. It is preferred that a center line of the slit 34E be equidistant from centers of the two ejection orifices 22A and 22B in the Y direction.

Sixth Embodiment

Figure 11A:
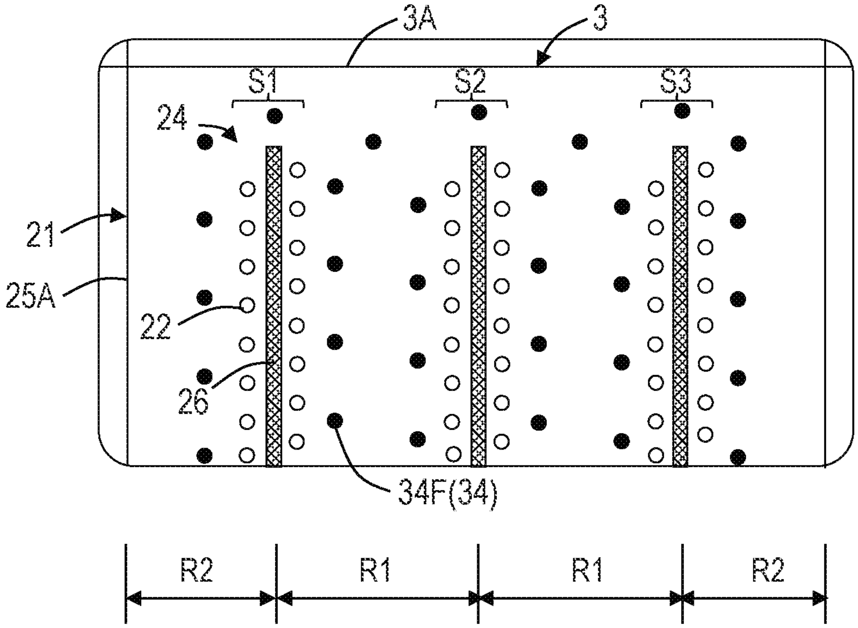
FIG. 11A and FIG. 11B are schematic views for illustrating a configuration of a protection tape according to a sixth embodiment.

FIG. 11A is a plan view for illustrating a sixth embodiment. In this embodiment, the penetration portion 34 is a circular hole 34F. However, a shape of the hole 34F is not required to be strictly circular, and may be, for example, oval. The number of the hole 34F is not limited, but it is desired that a plurality of holes 34F be formed in order to efficiently discharge air bubbles. The plurality of holes 34F are formed between two ejection orifice rows 24 that are combined with different liquid supply paths 26, respectively, and are adjacent to each other (in a first region R1), and between the ejection orifice row 24 and the first peripheral edge portion 25A (in a second region R2). It is preferred that a diameter of the hole 34F be equal to or larger than 0.1 mm and equal to or smaller than 0.2 mm. It is preferred that the hole 34F be formed using a laser.

The diameter of the hole 34F is smaller than the width of the slit 34A, and hence the air-bubble discharge performance of the hole 34F is lower than the air-bubble discharge performance of the slit 34A. In this embodiment, the holes 34F are arranged to be dispersed, and the holes 34F are formed also at positions closer to the ejection orifices 22. Accordingly, air bubbles near the ejection orifices 22 are promptly discharged, thereby being capable of improving sealing of the ejection orifices 22.

In order to avoid overlap between the ejection orifice 22 and the hole 34F, it is preferred that a distance D4 between a peripheral edge portion of the ejection orifice 22 and the hole 34F be equal to or larger than 0.1 mm and equal to or smaller than 0.3 mm. Further, in a direction (Y direction) in which the ejection orifice row 24 closest to the hole 34F extends, the hole 34F is located between the ejection orifice 22A, which has the smallest distance from the hole 34F, and the ejection orifice 22B, which is adjacent to the ejection orifice 22A. When two ejection orifices are equidistant from the slit 34E, any one of the two ejection orifices may be the ejection orifice 22A. Accordingly, even when a bonding position of the protection tape 3 is shifted in the Y direction within tolerance, the hole 34F can be prevented from being close to the ejection orifices 22A and 22B. It is preferred that a center of the hole 34F be equidistant from centers of the two ejection orifices 22A and 22B in the Y direction.

Figure 11B:
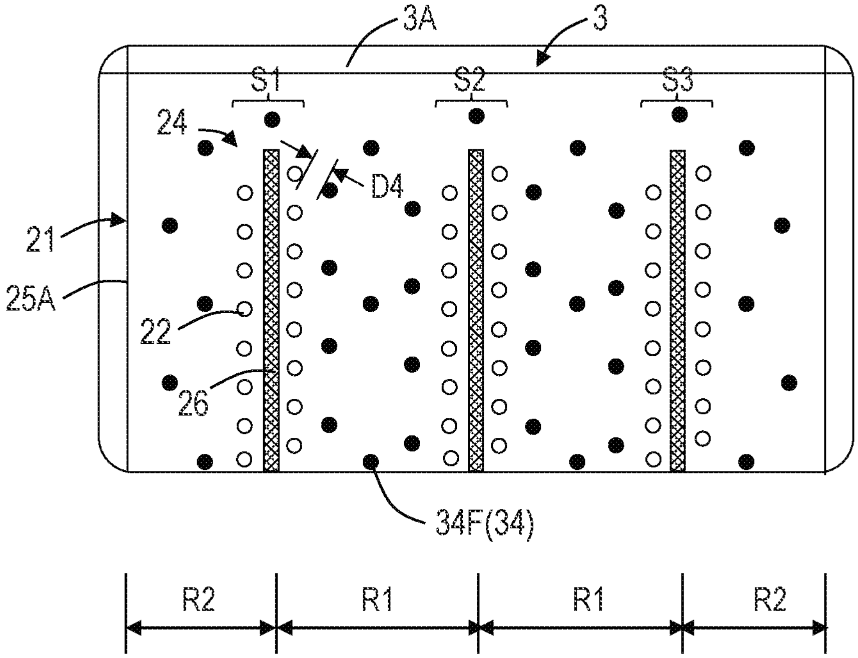

FIG. 11B is an illustration of a modification example of this embodiment. In the modification example, the holes 34F are also formed near a center between the ejection orifice rows 24 in which the air-bubble pool 6 is easily generated. As described above, the undulation is easily generated in the center portion of the ejection orifice forming surface 25, and hence it is sometimes difficult to seal the ejection orifices 22. In the modification example, arrangement density of the holes 34F formed in the first region R1 can be higher than arrangement density of the holes 34F formed in the second region R2. Accordingly, even when minute irregularities occur in the center portion of the ejection orifice forming surface 25, air bubbles are promptly discharged, thereby being capable of improving sealing of the ejection orifices 22. The holes 34F in the modification example and this embodiment may be combined with the slits 34A to 34E in the first to fifth embodiments.

According to the present disclosure, the liquid ejection head capable of suppressing generation of air bubbles between the protection tape and the ejection orifice forming surface can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-038560, filed Mar. 13, 2023, which is hereby incorporated by reference herein in its entirety.

What is claimed is:

1. A liquid ejection head comprising:

an ejection orifice forming surface including a plurality of ejection orifices from which liquid is to be ejected; and a protection tape bonded to the ejection orifice forming surface in a peelable manner, wherein the protection tape includes a base material and an adhesive layer laminated on the base material, and the adhesive layer is brought into contact with the ejection orifice forming surface, wherein the protection tape further includes at least one penetration portion that penetrates at least the base material in a thickness direction of the protection tape at a position being substantially flat and distant from the plurality of ejection orifices in the ejection orifice forming surface, and wherein gas permeability of the base material is lower than gas permeability of the adhesive layer, and the at least one penetration portion penetrates only the base material in the thickness direction.

2. The liquid ejection head according to claim 1, wherein the at least one penetration portion is at least one slit.

3. The liquid ejection head according to claim 2, further comprising:

a plurality of liquid supply paths configured to supply liquid to the plurality of ejection orifices; and a plurality of ejection orifice rows that are each formed of the plurality of ejection orifices, and are each combined with any one of the plurality of liquid supply paths, wherein the at least one slit is formed between two ejection orifice rows that are combined with different liquid supply paths, respectively, and are adjacent to each other.

4. The liquid ejection head according to claim 3, wherein the two ejection orifice rows extend in parallel to each other, and the at least one slit extends in parallel to the two ejection orifice rows.

5. The liquid ejection head according to claim 4, wherein the at least one slit includes one slit extending continuously along at least total lengths of the two ejection orifice rows.

6. The liquid ejection head according to claim 4, wherein the at least one slit includes a plurality of slits formed intermittently along at least total lengths of the two ejection orifice rows.

7. The liquid ejection head according to claim 3, wherein the two ejection orifice rows extend in parallel to each other, the at least one slit has a corrugated shape, and a long axis of a minimum rectangle enclosing the at least one slit extends in parallel to the two ejection orifice rows.

8. The liquid ejection head according to claim 3, wherein the two ejection orifice rows extend in parallel to each other, and the at least one slit extends in a direction orthogonal to the two ejection orifice rows.

9. The liquid ejection head according to claim 8, wherein, in a direction in which the two ejection orifice rows extend, the at least one slit is located between an ejection orifice of the plurality of ejection orifices which is closest to the at least one slit, and an ejection orifice of the plurality of ejection orifices which is adjacent to the ejection orifice closest to the at least one slit.

10. The liquid ejection head according to claim 3, wherein a separation distance between a slit, of the at least one slit, closest to a peripheral edge portion of the protection tape, and the peripheral edge portion is equal to or larger than 1.0 millimeter (mm) and equal to or smaller than 2.0 mm.

11. The liquid ejection head according to claim 2, wherein the ejection orifice forming surface includes a peripheral edge portion, and wherein the at least one slit is formed between the peripheral edge portion and an ejection orifice row closest to the peripheral edge portion.

12. The liquid ejection head according to claim 11, wherein the at least one slit extends at an angle with respect to the peripheral edge portion with the peripheral edge portion as one end of the at least one slit.

13. The liquid ejection head according to claim 2, wherein a width of the at least one slit is equal to or larger than 0.2 millimeter (mm) and equal to or smaller than 0.5 mm.

14. The liquid ejection head according to claim 1, wherein the at least one penetration portion is at least one circular hole.

15. The liquid ejection head according to claim 14, wherein the plurality of ejection orifices form at least one ejection orifice row, and wherein, in a direction in which an ejection orifice row closest to the at least one circular hole extends, the at least one circular hole is located between an ejection orifice of the plurality of ejection orifices which is closest to the at least one circular hole, and an ejection orifice of the plurality of ejection orifices which is adjacent to the ejection orifice closest to the at least one circular hole.

16. The liquid ejection head according to claim 14, further comprising:

a plurality of liquid supply paths configured to supply liquid to the plurality of ejection orifices; and a plurality of ejection orifice rows that are each formed of the plurality of ejection orifices, and are each combined with any one of the plurality of liquid supply paths, wherein the ejection orifice forming surface includes a peripheral edge portion, wherein the at least one circular hole includes a plurality of holes, wherein the plurality of holes is formed (i) in a first region between two ejection orifice rows that are combined with different liquid supply paths, respectively, and are adjacent to each other, and (ii) in a second region between the ejection orifice row and the peripheral edge portion, and wherein arrangement density of the holes formed in the first region is higher than arrangement density of the holes formed in the second region.

17. A protection tape to be bonded to an ejection orifice forming surface of a liquid ejection head in a peelable manner, wherein the ejection orifice forming surface includes a plurality of ejection orifices from which liquid is to be ejected, the protection tape comprising:

a base material;

an adhesive layer that is laminated on the base material, and is brought into contact with the ejection orifice forming surface; and at least one penetration portion that penetrates at least the base material in a thickness direction of the protection tape at a position being substantially flat and distant from the plurality of ejection orifices in the ejection orifice forming surface, wherein gas permeability of the base material is lower than gas permeability of the adhesive layer, and the at least one penetration portion penetrates only the base material in the thickness direction.

18. A manufacturing method for a liquid ejection head that includes an ejection orifice forming surface including a plurality of ejection orifices from which liquid is to be ejected, the manufacturing method comprising:

forming at least one penetration portion in at least a base material of a protection tape, which includes the base material and an adhesive layer laminated on the base material, such that the at least one penetration portion penetrates at least the base material in a thickness direction of the protection tape; and bonding the protection tape having the at least one penetration portion formed in the protection tape to the ejection orifice forming surface in a peelable manner so as to bring the adhesive layer into contact with the ejection orifice forming surface, wherein the at least one penetration portion is formed at a position being substantially flat and distant from the plurality of ejection orifices in the ejection orifice forming surface, and wherein gas permeability of the base material is lower than gas permeability of the adhesive layer, and the at least one penetration portion penetrates only the base material in the thickness direction.

* * * * *